(12) United States Patent
Lysaght

(10) Patent No.: US 6,567,754 B1
(45) Date of Patent: May 20, 2003

(54) QUALIFIER

(75) Inventor: Richard G. Lysaght, Hicksville, OH (US)

(73) Assignee: C.E. Electronics, Inc., Bryan, OH (US)

( * ) Notice: Subject to any disclaimer, the term of this patent is extended or adjusted under 35 U.S.C. 154(b) by 204 days.

(21) Appl. No.: 09/804,109

(22) Filed: Mar. 12, 2001

(51) Int. Cl.[7] .............................................. G01L 1/00
(52) U.S. Cl. ........................................................ 702/41
(58) Field of Search .................................. 702/41, 138

(56) References Cited

U.S. PATENT DOCUMENTS

| | | | | |
|---|---|---|---|---|
| 4,791,838 A | * | 12/1988 | Bickford et al. | ............ 702/138 |
| 4,864,903 A | * | 9/1989 | Bickford et al. | ............... 81/467 |
| 5,592,396 A | * | 1/1997 | Tambini et al. | ............... 81/467 |
| 5,689,434 A | * | 11/1997 | Tambini et al. | ............... 702/45 |
| 5,937,370 A | | 8/1999 | Lysaght | |
| 6,055,484 A | | 4/2000 | Lysaght | |

* cited by examiner

*Primary Examiner*—John Barlow
*Assistant Examiner*—Anthony T Dougherty
(74) *Attorney, Agent, or Firm*—Emch, Schaffer, Schaub & Porcello Co., L.P.A.

(57) ABSTRACT

This qualifier uses multiple thresholds and multiple timers to perform its operations. This assembly qualifier is a counting apparatus that monitors either the pressure of an air tool, the current of an electrical tool or the torque of a mechanical wrench to determine if the tool has shutoff at a target torque. The qualifier also determines if some unknown means shuts off the tool. For example, the system detects proper fastening, nuisance trips, double hits, fasteners that are too short, fasteners that are too long, the use of non-use of washers, effective or non-effective pulsing and proper clutch shut off.

16 Claims, 9 Drawing Sheets

QUALIFIER

TECHNICAL FIELD

This invention relates to a tool monitor and assembly qualifier that verifies that the correct number of fasteners have been properly installed into an assembly. When used in conjunction with a pneumatic tool, electric tool, or mechanical click wrench containing a mechanical clutch or torque switch, proper fastener installation and count can be verified. The device monitors an analog signature created by a tools internal pressure, current flow or voltage and has the ability to "learn" the analog curve's characteristics during the assembly process.

BACKGROUND OF THE INVENTION

U.S. Pat. Nos. 6,055,484 and 5,937,370 represent a recent, significant development in the field of tool monitoring and assembly qualifying. The programmed microprocessor is configured to identify a portion of the signal representative of the analog signal corresponding to a completed cycle. The configuration also allows for identification of an incomplete cycle and a multiple counting of a completed cycle (double-hit). A completed cycle occurs when a tool drives a fastener to completion causing the tool's mechanical clutch or torque switch to end the cycle. An incomplete cycle occurs when a tool drives a fastener and the clutch or torque switch is not allowed to complete the cycle by turning the tool off, meaning that the proper torque is never reached. A double-hit occurs when a tool drives a fastener that has previously been tightened to the target torque. The qualifiers and disclosures of U.S. Pat. Nos. 6,055,484 and 5,937,370 are herein incorporated by reference.

In the previous invention, the programmed microprocessor is configured to identify and store the parameter of a first period of time for the analog signal to attain an initial predetermined range. The microprocessor also is configured to identify and store a second period of time for the analog signal to attain a second predetermined range. The qualifier quite nicely tells if a fastener is put in properly and if the clutch or torque switch has fired indicating that a fastening process is complete.

BRIEF SUMMARY OF THE INVENTION

The next generation qualifier uses multiple thresholds and multiple timers to perform its operations. This assembly qualifier is a counting apparatus that monitors either the pressure of an pneumatic tool, the current flow through an electric tool, or the switch closure of a torque switch on a mechanical wrench to determine if the tool's clutch has shut the tool off indirectly confirming that the target torque has been reached. The qualifier also determines if some unknown means shut off the tool besides the clutch. For example, the system detects proper fastening, nuisance trips, double hits, fasteners that are too short, fasteners that are too long, the use or non-use of washers, effective or non-effective pulsing, and proper clutch shut off. The microprocessor may also be configured to identify and store a third period of time for the analog signal to attain a third predetermined range. This version makes use of up to four thresholds and five timers in order to accomplish its qualification of an assembly process.

This system for monitoring analog signatures comprised of a means to convert air pressure, electrical current, or a switch closure into an electrical signal representative of the aforementioned pressure, current, or switch closure, a means for electrically computationally processing the electrical signal into another signal representing at least one parameter corresponding to a condition of the tool being monitored which is a function of the analog signal, and a programmed microprocessor configured to identify a portion of the analog signal corresponding to the parameter. The programmed microprocessor is configured to identify and store the parameter of a first threshold analog signal to begin monitoring and storing the parameter of a cycle. Next, the programmed microprocessor is configured to identify and store the parameter of a second analog level of the tool driving the fastener to its target torque and configured to identify and store the parameter of a third analog level to count a completed cycle when the measured analog signal is in the same as the third identified and stored parameter. Finally, the programmed microprocessor is configured to identify and store the parameter of a fourth analog level which indicates the shut off region of the cycle when the measured analog signal is above the fourth identified and stored parameter.

DETAILED DESCRIPTION OF THE INVENTION

Figure 1:
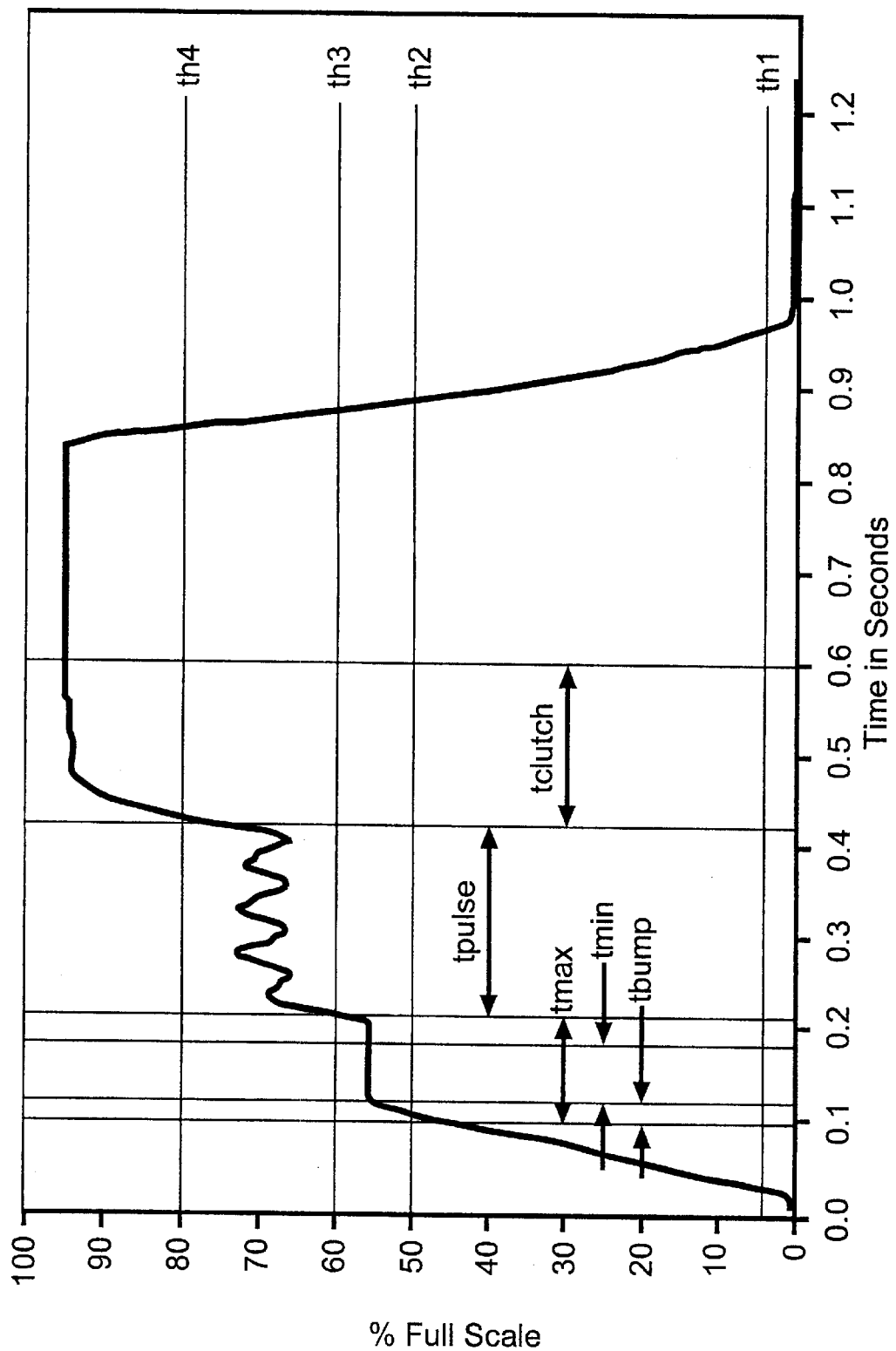
FIG. 1 shows the signature for a conventional pneumatic pulse tool monitored according to this invention.

FIG. 1 is the pneumatic signature of a pulse tool. The system monitors a compressed air driven tool by a means for measuring air pressure between the tool's trigger and its pneumatic motor. This air pressure is converted into an electrical signal and the pre-programmed microprocessor is configured to determine if the electrical signal has met the requirements set forth by the thresholds and timers The signature or graph shows three distinct regions.

The rundown region which occurs at 55 PSI

The pulsing region which occurs around 68 PSI

The clutch shut-off region that occurs at 94 PSI

Four thresholds are drawn onto the graph and labeled TH1, TH2, TH3, and TH4. TH1 is a threshold used by the control to know when it's in cycle. The threshold will be just above the noise floor. As soon as the signal rises above that threshold, the qualifier will begin monitoring and storing data.

When the signal level passes, TH2 but remains below TH3 the qualifier will consider the tool to be in the run-down region. Three timers are used in this region.

Tbump will be used to ignore nuisance trips. If the tool does not run longer than Tbump, it is ignored.

Tmin is the minimum time that the signal must remain in the run-down phase. Tmin will catch double-hits, fasteners that are too short for the process, and can also recognize if a washer was used and was not supposed to be.

Tmax sets the maximum amount of time the tool can remain in the run down phase. Tmax will enable the qualifier to reject fasteners that are too long for the process and also detect missing washers.

When the signal enters the region between TH3 and TH4, it will consider the tool to be in the pulsing region. The timer Tpulse will be associated with this region. Pulse tools are ineffective if they are not allowed to pulse 3 or 4 times. Tpulse will set a minimum amount of time that the tool must remain in the pulsing region guaranteeing that the mechanical torque adjustment on the tool will be effective.

The final threshold (TH4) sets the region above which the signal will be considered to have clutched out. The signal will have to remain in that region for a time greater than Tclutch.

Figure 2:
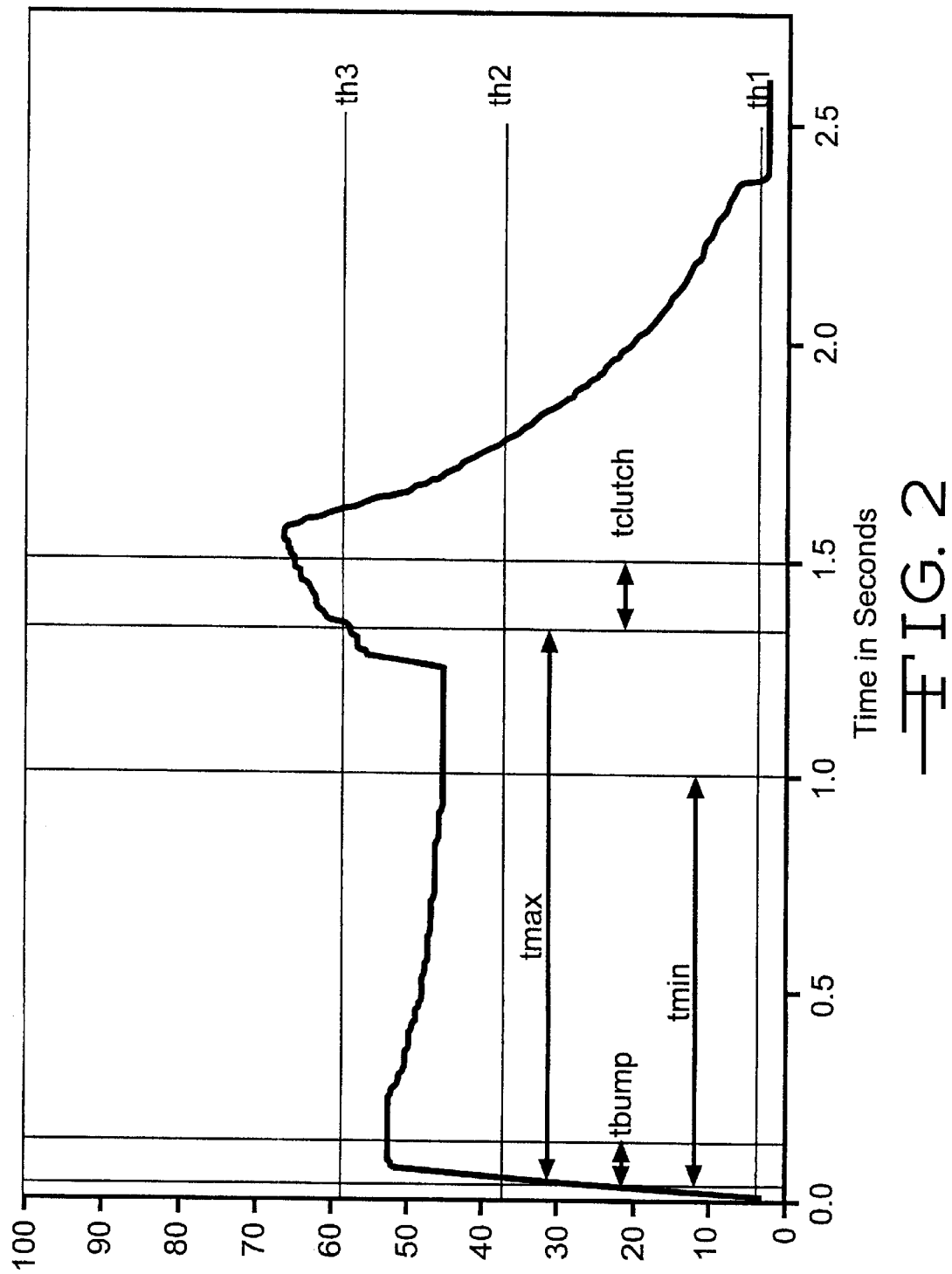
FIG. 2 shows the signature for a conventional pneumatic direct drive tool monitored according to this invention.

FIG. 2 is the pneumatic signature of a direct drive tool. The system monitors a compressed air driven tool by a means for measuring air pressure between the tool's trigger and its pneumatic motor. This air pressure is converted into an electrical signal and the pre-programmed microprocessor is configured to determine if the electrical signal has met the requirements set forth by the thresholds and timers.

The signature of the graph shows two distinct regions

The run-down region at 45–50 PSI.

The clutched out region at 60 PSI and above.

The qualifier will use three thresholds and four timers in order to qualify this type of signature. TH1 will set the noise floor. Once the signal rises above this level, the qualifier will start monitoring the process and storing data.

When the signal enters the region between TH2 and TH3, the qualifier will consider the tool to be in the run-down phase.

Tbump will be used to ignore nuisance trips. If the tool does not run longer than Tbump, it is ignored.

Tmin is the minimum time that the signal must remain in the run-down phase. Tmin will catch double-hits, fasteners that are too short for the process, and can also recognize if a washer was used and was not supposed to be.

Tmax sets the maximum amount of time the tool can remain in the run down phase. Tmax will enable the qualifier to reject fasteners that are too long for the process and also detect missing washers.

Once the signal rises above TH3, the qualifier will determine that the tool has clutched out. Timer Tclutch will determine if the signal was in this region long enough.

Figure 3:
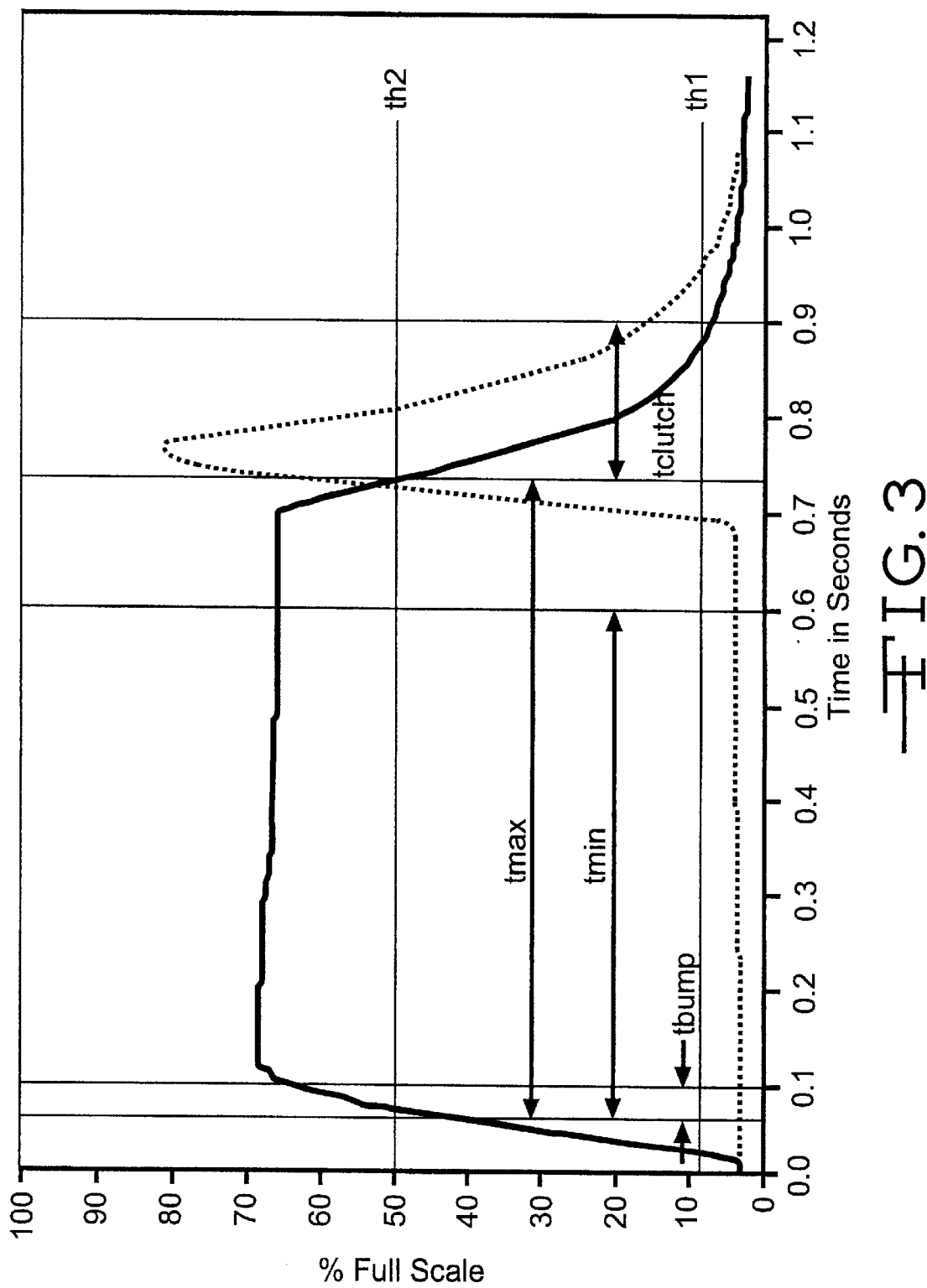
FIG. 3 shows the signature for a conventional electric tool monitored according to this invention.

FIG. 3 is the current signature of an electric tool. The system monitors an electrically driven tool having a forward or reverse current flow through the tool by employing a current transducer for measuring and converting the forward and reverse currents into electrical signals.

By using these electrical signals, a pre-programmed microprocessor is configured to determine if the electrical signal has met the requirements set forth by the thresholds and timers.

There are two phases in this fastening process. The solid line depicts the run-down phase and the dashed line depicts the inductive spike, which is indicative of the clutch turning the tool off.

Two thresholds and four timers will qualify this type of signature. TH1 will set the noise floor above which, the qualifier will start monitoring the process and recording data.

When the signal rises above TH2, the qualifier will consider the tool to be in the run-down phase. Three timers will be employed during the run-down phase.

Tbump will be used to ignore nuisance trips. If the tool does not run longer than Tbump, it is ignored.

Tmin is the minimum time that the signal must remain in the run-down phase. Tmin will catch double-hits, fasteners that are too short for the process, and can also recognize if a washer was used and was not supposed to be.

Tmax sets the maximum amount of time the tool can remain in the run down phase. Tmax will enable the qualifier to reject fasteners that are too long for the process and also detect missing washers.

Once the signal drops back below TH2, the qualifier will start looking for an inductive spike, which is indicative of the tool's clutch stopping the tool when torque is achieved. If the spike occurs before Tclutch expires, the signature will be considered good.

Figure 4:
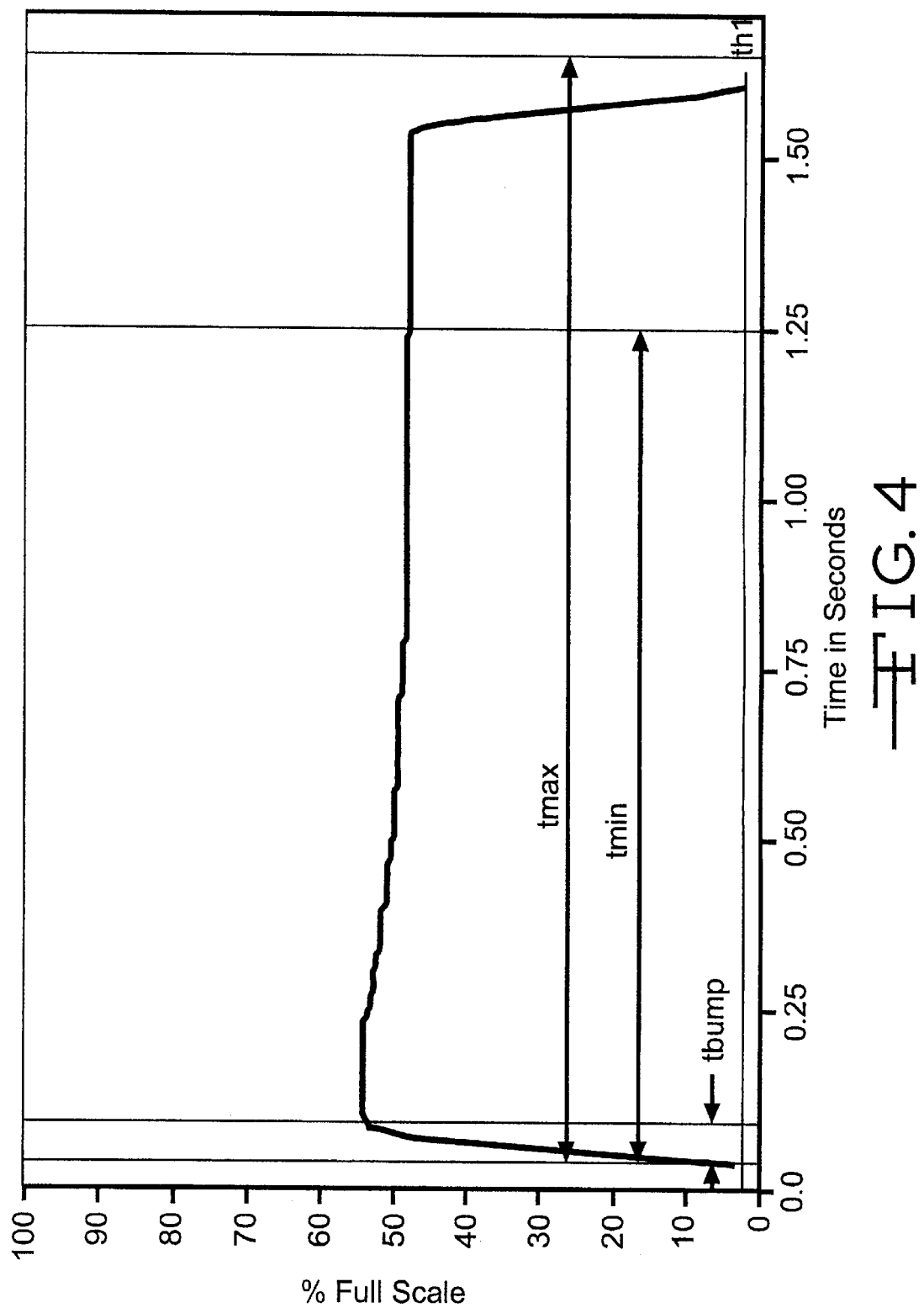
FIG. 4 shows the signature for a conventional RF tool, click wrench or pneumatic push to start tool monitored according-to this invention.

FIG. 4 may be the signature for a pneumatic push to start tool, an RF tool, or a click wrench. In the case of the RF tool and click wrench, a switch closure indicates when torque is met. With the RF tool, the switch closure initiates an RF transmission, which is detected by the qualifier. The click wrenchs switch closure sends out a voltage, which is read by the qualifier. The qualifier uses a pressure transducer to detect the presence or absence of pressure within a push to start tool.

In all three cases (RF, click wrench, or push to start tool) the signal is converted to an electrical signal, which is either on or off. A pre-programmed microprocessor is configured to determine if the electrical signal has met the requirements set forth by the thresholds and timers.

One threshold (TH1) and three timers are employed to qualify this signature.

Once the signature rises above the noise floor (TH1), it will be considered in cycle and three timers will be started.

Tbump will be used to ignore nuisance trips. If the tool does not run longer than Tbump, it is ignored.

Tmin is the minimum time that the signal must remain in the run-down phase. In the case of the push to start Tmin will catch double-hits, fasteners that are too short for the process, and can also recognize if a washer was used and was not supposed to be. Tmin is also the minimum time that an RF tool or click wrench must be held after the torque switch is asserted.

Tmax sets the maximum amount of time the tool can remain in the run down phase. In the case of the push to start tool Tmax will enable the qualifier to reject fasteners that are too long for the process and also detect missing washers. Tmax will keep users from applying too much torque to a fastener in the case of an RF or click-wrench.

FIGS. 1–4 have a vertical axis measured in % Full Scale because the device monitors an analog signature representative of air pressure, current flow, torque and the like. The Scale represents pressure, torque or voltage. In FIGS. 1 and 2, the Scale represents 0 to 100 psi. In FIG. 3, the Scale represents current flow or voltage. In FIG. 4, the Scale represents air pressure or voltage.

Figure 5:
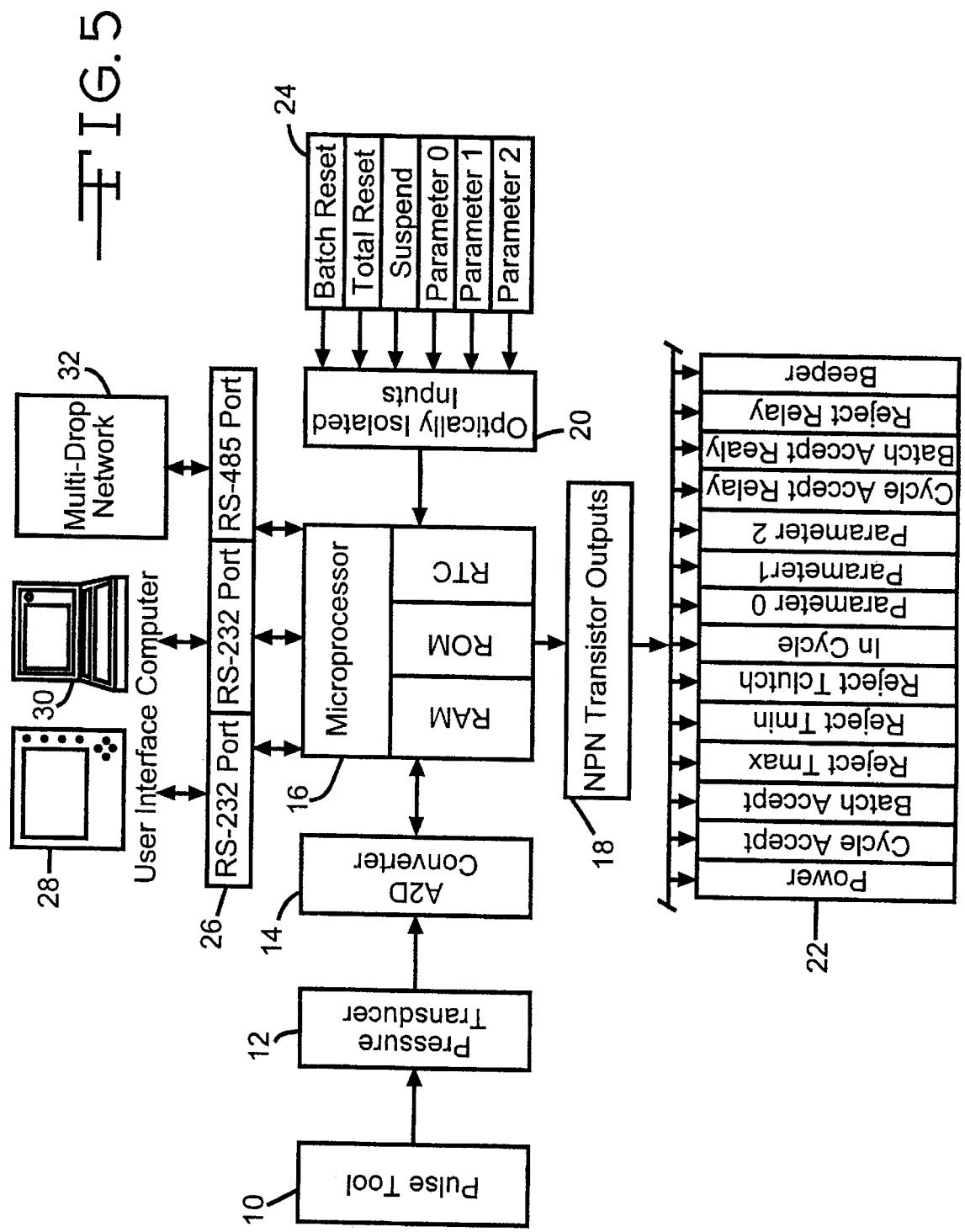
FIG. 5 is a diagram for monitoring a conventional pneumatic pulse tool according to this invention.

FIG. 5 illustrates a pulse tool qualifier according to this invention. FIG. 1 shows pneumatic pulse tool 10 connected to pressure transducer 12. Transducer 12 measures air pressure between tool 10's trigger and pneumatic motor and converts the pressure to electrical signals. A/D converter 14 receives the electrical signal from transducer 12 and converts them into binary code for use by microprocessor 16. NPN transistor outputs 18 and optically isolated inputs 20 represent the measured parameter of this invention. Output 18 may be any of listed parameters 22. Input 20 represents any of the listed parameters 24.

Figure 6:
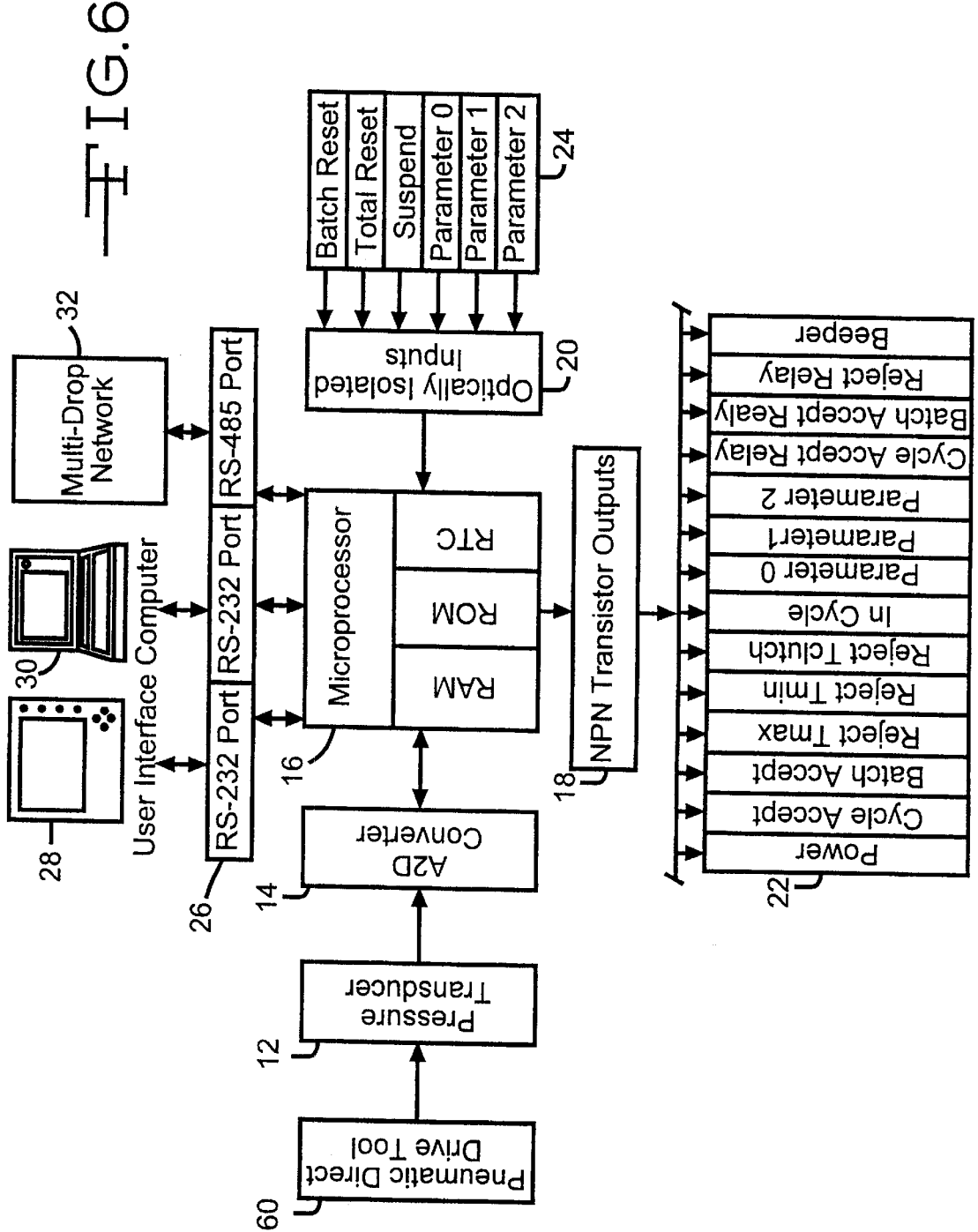
FIG. 6 is a diagram for monitoring pneumatic direct drive tool according to this invention.

FIG. 6 illustrates a pneumatic direct drive qualifier according to this invention. The illustration is the same as FIG. 5 except for pneumatic direct drive tool 60.

Figure 7:
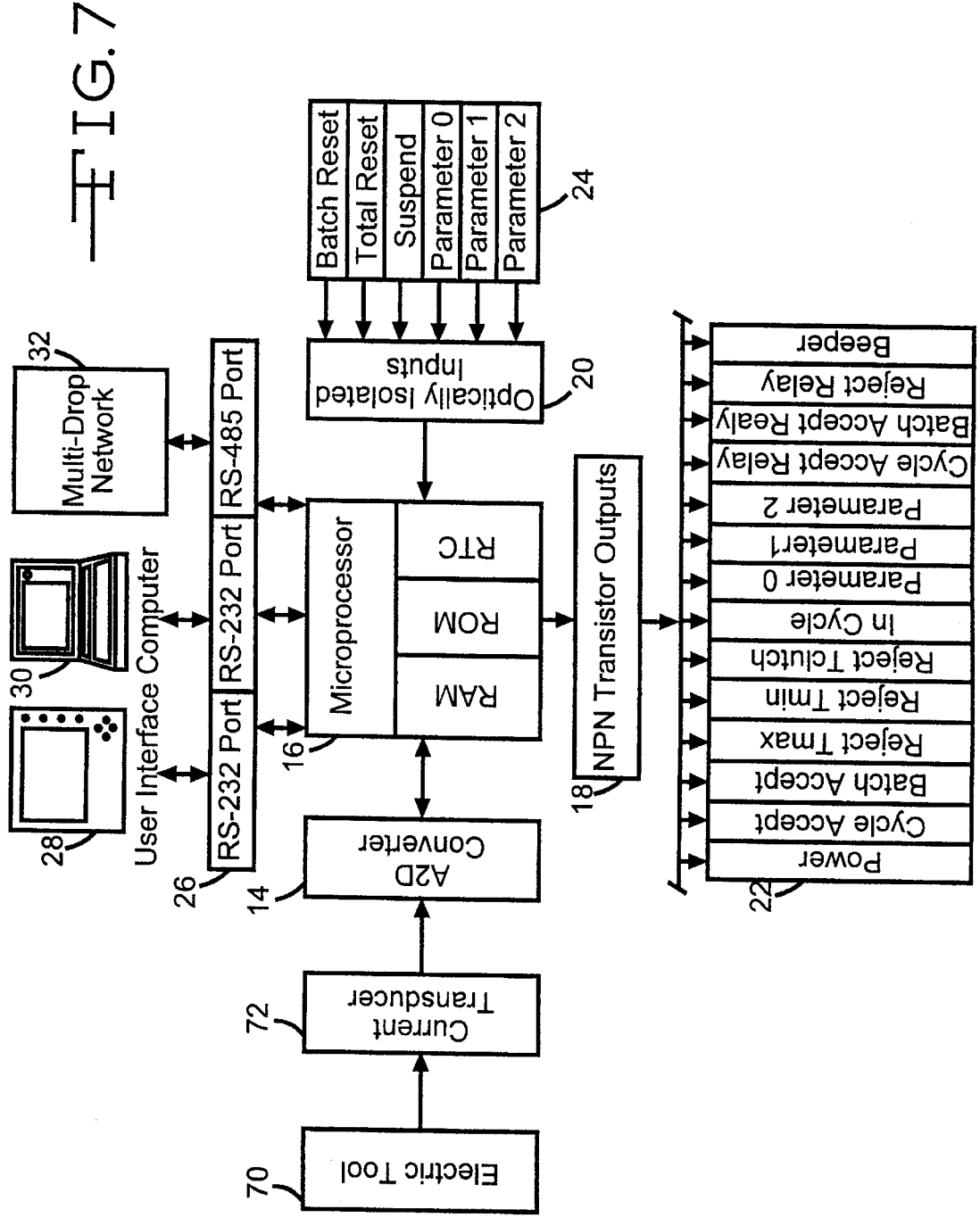
FIG. 7 is a diagram for monitoring an electric tool according to this invention.

FIG. 7 illustrates an electric tool qualifier according to this invention. The illustration is the same as FIG. 5 except for electric tool 70 and current transducer 72. Transducer 72 converts forward or reverse currents into electrical signals for AID converter 14.

Figure 8:
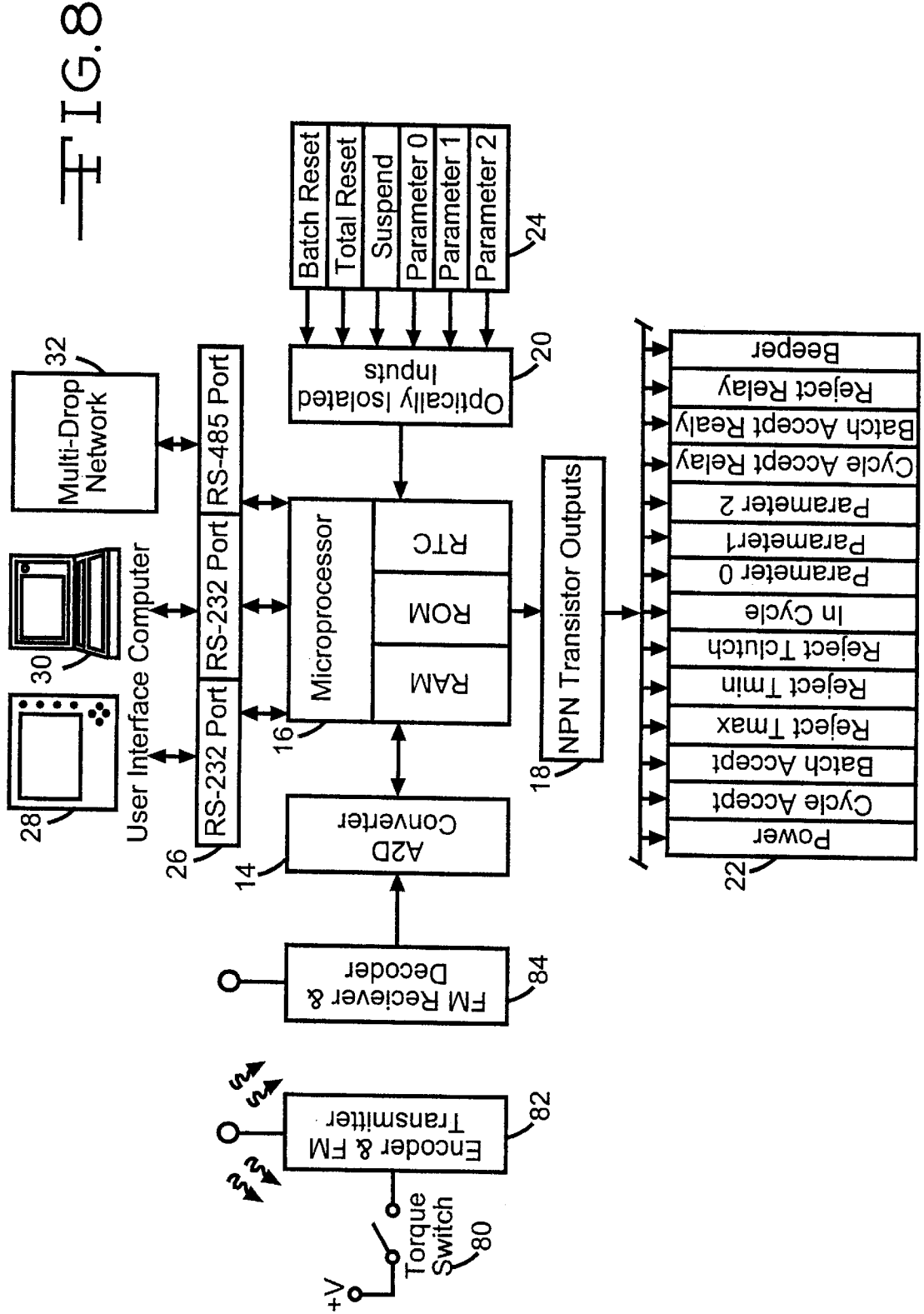
FIG. 8 is a diagram for monitoring an RF controlled tool according to this invention.

FIG. 8 illustrates an RF qualifier according to this invention. FIG. 8 shows torque switch 80 connected to encoder FM transmitter 82. A switch 80 closure indicates torque is met. Switch 80 closure initiates an RF transmission from transmitter 82 to FM receiver and decoder 84. A/D converter 14 receives an electrical signal from receiver 84 and converts them into binary code for use by microprocessor 16. The remainder of the illustration is the same as FIG. 5.

Figure 9:
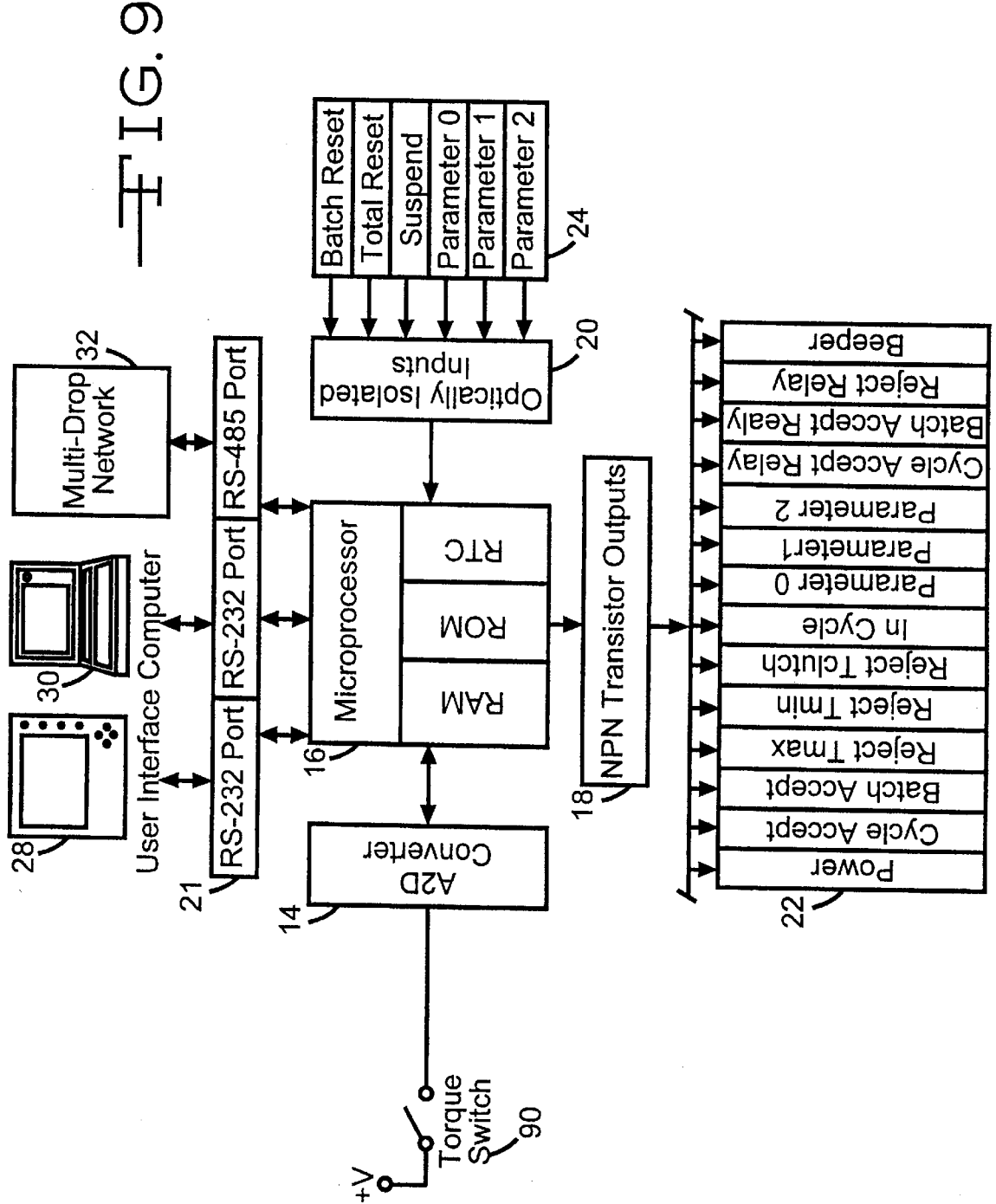
FIG. 9 is a diagram for monitoring a tool having a torque switch according to this invention.

FIG. 9 illustrates a torque switch qualifier such as that used in click wrenches. The click wrenches include torque switch 90. Switch 90 closure indicates torque has been met. Switch 90's closure sends out a voltage which A/D converter 14 converts into binary code for microprocessor 16. The qualifier then follows the procedure of FIG. 5.

In addition to these embodiments, persons skilled in the art can see that numerous modifications and changes may be made to the above invention without departing from the intended spirit and scope thereof.

I claim:

1. A system for monitoring a compressed air driven tool comprising:

a means for measuring air pressure between the trigger of a pneumatic pulse tool and the motor and converting the air pressure into an electrical signal representative of the air pressure;

a means for electrically computationally processing the electrical signal into another signal representative at least one parameter corresponding to a condition of the tool being monitored which is a function of air pressure;

a programmed microprocessor configured to identify a portion of the signal representative of the air pressure corresponding to the parameter;

wherein the program microprocessor is configured to identify and store the parameter of a first threshold air pressure to begin monitoring the parameter of a cycle;

wherein the programmed microprocessor is configured to identify and store the parameter of a second air pressure to identify a portion of the signal representative of the air pressure of the tool driving a fastener to its target torque;

wherein the programmed microprocessor is configured to identify and store the parameter of a third air pressure to count a completed cycle when the measured air pressure is in the same range as the third identified and stored parameter; and wherein the programmed microprocessor is configured to identify and store the parameter of a fourth air pressure to indicate a shut off region of the cycle when the measured air pressure is above the fourth identified and stored parameter.

2. A system according to claim 1 wherein the microprocessor is configured to identify a rejected count if the measured air pressure remains above the second stored air pressure and below the third measured air pressure for more than the maximum amount of time.

3. A system according to claim 1 wherein the microprocessor is configured to indicate a pulsing region when the measured air pressure is between the third stored air pressure and the forth stored air pressure.

4. A system according to claim 1, wherein the microprocessor is configured to indicate a successful pulsing when the measured air pressure remains between the third stored pressure and the forth stored air pressure for a minimum period of time.

5. A system according to claim 1 wherein the microprocessor is configured to indicate a clutch shut-off when the measured air pressure is above the fourth air pressure for a minimum period of time.

6. A system for monitoring a compressed air driven direct drive tool comprising:

a means for measuring air pressure between a trigger and a motor of a direct drive tool and converting the air pressure into an electrical signal representative of the air pressure, a means for electrically computationally processing the electrical signal into another signal representing at least one parameter corresponding to a condition of the tool being monitored which is a function of the air pressure;

a programmed microprocessor configured to identify a portion of the signal representative of the air pressure corresponding to the parameter;

wherein the programmed microprocessor is configured to identify and store the parameter of a first threshold air pressure to begin monitoring and storing the parameter of a cycle;

wherein the programmed microprocessor is configured to identify and store the parameter of a second air pressure to identify a portion of the signal representative of the air pressure of the tool driving a fastener to its target torque;

wherein the programmed microprocessor is configured to identify and store the parameter of a third air pressure to count a completed cycle when the measured air pressure is in the same range as the third identified and stored parameter; and wherein the programmed microprocessor is configured to identify and store the parameter of a third air pressure to indicate a clutch shut off region of the cycle when the measured air pressure is above the third identified and stored parameter.

7. A system according to claim 6 wherein the microprocessor is configured to identify an incomplete count if the measured air pressure remains above the second stored air pressure and below the third measured air pressure for less then a minimum period of time.

8. A system according to claim 6 wherein the microprocessor is configured to identify a rejected count if the measured air pressure remains above the second stored air pressure and below the third measured air pressure for more than the maximum amount of time.

9. A system according to claim 6 herein the microprocessor is configured to count a completed cycle when the measured air pressure is above the second stored air pressure and reaches the third stored air pressure in a prescribed period of time.

10. A system according to claim 6 wherein the microprocessor is configured to indicate a run-down region when the measured air pressure passes the second stored air pressure, but is below the third stored air pressure.

11. A system according to claim 6 wherein the microprocessor is configured to indicate a clutch shut-off when the measured air pressure is above the third air pressure for a minimum period of time.

12. A system for monitoring an electrically driven tool having a forward or reverse current flow through the tool comprising:

a current transducer for measuring and converting the forward and reverse currents into electrical signals representative of the measured currents;

a means for electrically computationally processing the electrical signals into another signal representing at least one parameter corresponding to a condition of the tool being monitored which is a function of the current;

a programmed microprocessor configured to identify a portion of the signal representative of the current corresponding to the parameter;

wherein the programmed microprocessor is configured to identify and store the parameter of a first threshold current to begin monitoring and storing the parameter from a cycle;

wherein the programmed microprocessor is configured to identify and store the parameter of a second current to identify a portion of the signal representative of the current of the tool driving a fastener until the tools clutch stops the tool;

wherein the programmed microprocessor is configured to identify and store the parameter of the second current to count a completed cycle when the measured current is the same range as the second current; and wherein the programmed microprocessor is configured to identify and store the parameter of an inductive current spike to indicate a clutch shut off region of the cycle when the measure current drops back below the second current.

13. A system according to claim 12 wherein the microprocessor is configured to identify a rejected count if the measured current level remains above the second stored current level for more than the maximum amount of time.

14. A system according to claim 12 wherein the microprocessor is configured to indicate a clutch shut-off when the inductive spike occurs following a run-down region within a specified period of time.

15. A system for monitoring a mechanical torque wrench with a torque switch comprising:

means for electrically stimulating the switch wherein the torque switch can provide an electrical signal upon reaching target torque;

a means for electrically computationally processing the electrical signal into another signal representing at least one parameter corresponding to a condition of the tool being monitored which is a function of torque;

a programmed microprocessor configured to identify a portion of the signal representative of the torque corresponding to the parameter;

wherein the programmed microprocessor is configured to identify and store the parameter of a threshold above which torque is considered to have been met;

wherein the programmed microprocessor is configured to identify and store the parameter of the torque to count a completed cycle when the measured torque is in the same as the threshold; and wherein the microprocessor is configured to indicate an over-torque situation when the torque signal remains above the threshold for a time greater than the prescribed period of time.

16. A system according to claim 15 wherein the microprocessor is configured to indicate a properly torqued fastener when the torque signal remains above the threshold for a prescribed period of time.

* * * * *